United States Patent [19]

Hensley

[11] Patent Number: 4,643,280
[45] Date of Patent: Feb. 17, 1987

[54] PORTABLE DESK AND ARTICLE CARRYING STRUCTURE FOR USE WITH SHOPPING CARTS

[76] Inventor: Howard L. Hensley, 3020 W. Foothill Dr., Phoenix, Ariz. 85027

[21] Appl. No.: 835,202

[22] Filed: Mar. 3, 1986

[51] Int. Cl.⁴ .......................... A45C 11/36; B62B 5/00; A45F 4/00
[52] U.S. Cl. .................................... 190/11; 190/18 R; 108/44; 224/273; 224/275; 280/33.99 A; 280/DIG. 4; 312/244
[58] Field of Search ...................... 190/1, 10, 11, 12 R, 190/12 A, 18 R; 224/42, 43, 273, 275; 280/33.99 A, DIG. 4; 312/244, 337; 150/52 R; 108/44

[56] References Cited

U.S. PATENT DOCUMENTS

| | | | |
|---|---|---|---|
| 791,506 | 6/1905 | Simmons | 312/244 X |
| 971,584 | 10/1910 | Berthold et al. | 312/244 X |
| 2,609,072 | 9/1952 | Levinson | 190/11 |
| 3,073,057 | 1/1963 | Farber | 312/244 X |
| 3,923,356 | 12/1975 | Washburne | 312/244 X |
| 3,968,992 | 7/1976 | Hogan | 312/244 X |
| 4,156,318 | 5/1979 | Economy | 280/33.99 A X |
| 4,453,788 | 6/1984 | Russell | 224/273 X |
| 4,538,861 | 9/1985 | Hughes, Jr. | 190/10 X |
| 4,577,788 | 3/1986 | Richardson | 224/273 |
| 4,583,753 | 4/1986 | Economy | 280/33.99 |

FOREIGN PATENT DOCUMENTS 11172 of 1913 United Kingdom .................. 190/10

Primary Examiner—William Price
Assistant Examiner—Sue A. Weaver
Attorney, Agent, or Firm—Herbert E. Haynes, Jr.

[57] ABSTRACT

A portable desk and article carrying structure is disclosed primarily for use by manufacturers representatives, sales people, and the like for carrying the various articles and tools needed for displaying, promoting and selling products. The portable desk and article carrying structure allows such articles to be carried into a store and is demountably positionable on a shopping cart of the type commonly used in grocery stores so as to provide a convenient surface for writing and accomplishing various other tasks at locations within the store.

14 Claims, 4 Drawing Figures

PORTABLE DESK AND ARTICLE CARRYING STRUCTURE FOR USE WITH SHOPPING CARTS

BACKGROUND OF THE INVENTION

1. Field of the Invention

This invention relates in general to desks and more particularly to a portable desk with an article containment case that is specifically designed for use with shopping carts.

2. Description of the Prior Art

Manufactures representatives such as food brokers, sales people and the like make frequent calls on large numbers of stores for the purposes of taking orders, labeling products, setting up and checking displays and various other jobs relating to supplying, displaying, promoting and selling of their products. In order to do their job, such people need to carry various articles and tools with them such as order forms, survey sheets, promotional materials, labels, tape, pencils, a staple gun and the like. And, upon arriving at a work location, they need some place to work; and more often than not, the work location will lack adequate work space.

Most manufactures representatives and sales people will carry a brief case which provides them with means for carrying the articles they need, and upon arriving at the work location they may find it completely lacking in a suitable work space. To solve this, some set their brief case on the floor in the aisle and work out of the briefcase while working with a clip board for writing purposes. This is very awkward so many people faced with this situation will use a shopping cart of the type commonly used in grocery stores if such a cart is available. Although working out of a shopping cart is an improvement over working on the floor, it is still awkward in that the only place which will support a briefcase with any degree of stability is the bottom of the basket of the cart. It is difficult to use the brief case as a writing surface when it is located in the basket of a shopping cart, therefore, writing must still be done on a clip board or similar structure.

These same problems exist for store personnel who must do similar jobs at various locations in their stores. To the best of my knowledge, no solution has been devised or proposed for easing the problems associated with tasks of the above described type. Therefore, a need exists for a new and useful portable desk and article carrying structure which overcomes some of the problems and shortcomings of the prior art.

SUMMARY OF THE INVENTION

In accordance with the present invention, a new and useful portable desk and article carrying structure is disclosed primarily for use by manufactures representatives, sales people, store personnel and the like. The structure is configured for use in transporting various articles such as order forms, survey sheets, labels, sign making materials and the various tools need to accomplish the multitude of tasks associated with displaying, promoting and selling products. The structure is further configured to be used in conjunction with a shopping cart of the type commonly found in grocery stores. The portable desk and article carrying structure is adapted to be supported on such a cart to provide a work station at whatever location it is needed in the store.

The portable desk and article carrying structure includes a planar desk top with a four sided case means beneath the desk top. The carrying case has a front wall, rear wall and an opposed pair of sidewalls the lower edges of which surround and thereby define an open bottom end of the case means. The opposed sidewall members of the case means have a first pair of aligned notches which open onto their lower edges proximate the front wall of the case means and a second pair of aligned notches similarly formed therein proximate the rear wall of the case means. The aligned pairs of notches allow the portable desk and article carrying structure to be placed in supporting resting engagement on top of the shopping cart proximate the push handle end thereof so that it is disposed in a proper substantially horizontal attitude and at a proper height for writing and accomplishing the various other tasks that need to be accomplished by people of the types mentioned above.

In a first embodiment, the case means is fixedly attached to the lower surface of the desk top and an article carrying means in the form of a slide drawer structure is mounted in the carrying case. The drawer structure is slidably movable in an opening provided in the front wall of the case means so that when opened it will open toward the push handle end of the shopping cart.

In a second embodiment, the planar desk top is hingely connected to the upper edge of the rear wall of the case means so that access thereto is gained through the desk top when it is raised. An article carrying means in the form of an upwardly open tray-like structure is fixedly mounted in the case means.

The slide drawer of the first embodiment and the upwardly opening tray-like structure of the second embodiment may be compartmentalized, such as by providing suitable partitions therein for segregated carrying of the various articles and tools needed to accomplish a particular job or jobs. In addition to such compartmentalization, the portable desk and article carrying structures of both embodiments may be customized to accommodate specialized articles and tools as desired and needed.

The portable desk and article carrying structure of the present invention is provided with suitable latch means which are used to hold the drawer closed in the first embodiment, and to hold the desk top closed in the second embodiment. The latch means in conjunction with a suitable handle allows the portable desk and article carrying structure of this invention to be carried in a manner similar to a suitcase, brief case and the like.

Accordingly, it is an object of the present invention to provide a new and useful portable desk and article carrying structure for use by manufactures representatives, sales people, and others who need to carry various articles and tools into areas where a job is to be accomplished and who need a place to work in those areas.

Another object of the present invention is to provide a new and useful portable desk and article carrying structure which is configured to be restingly supportable on a shopping cart so as to provide a convenient surface for writing, working, and the like, and to provide ready access to the various articles carried therein.

Another object of the present invention is to provide a new and useful portable desk and article carrying structure of the above described character having a planar desk top with a four-sided case beneath the top. The case is formed so that its four sides have the lower edges surroundingly defining an open bottom and the opposed side edges are notched for demountable supportive placement on top of the shopping cart.

Another object of the present invention is to provide a new and useful structure of the above described type having a first embodiment wherein the case portion of the structure has a suitably compartmentalized slide drawer mounted therein for containment of the various articles and tools, and a second embodiment wherein the desk top is hinged to provide access to a suitably compartmentalized tray which is fixedly mounted in the case means of the structure.

The foregoing and other objects of the present invention as well as the invention itself, may be more fully understood from the following description when read in conjunction with the accompanying drawings.

DESCRIPTION OF THE PREFERRED EMBODIMENTS

Figure 1:
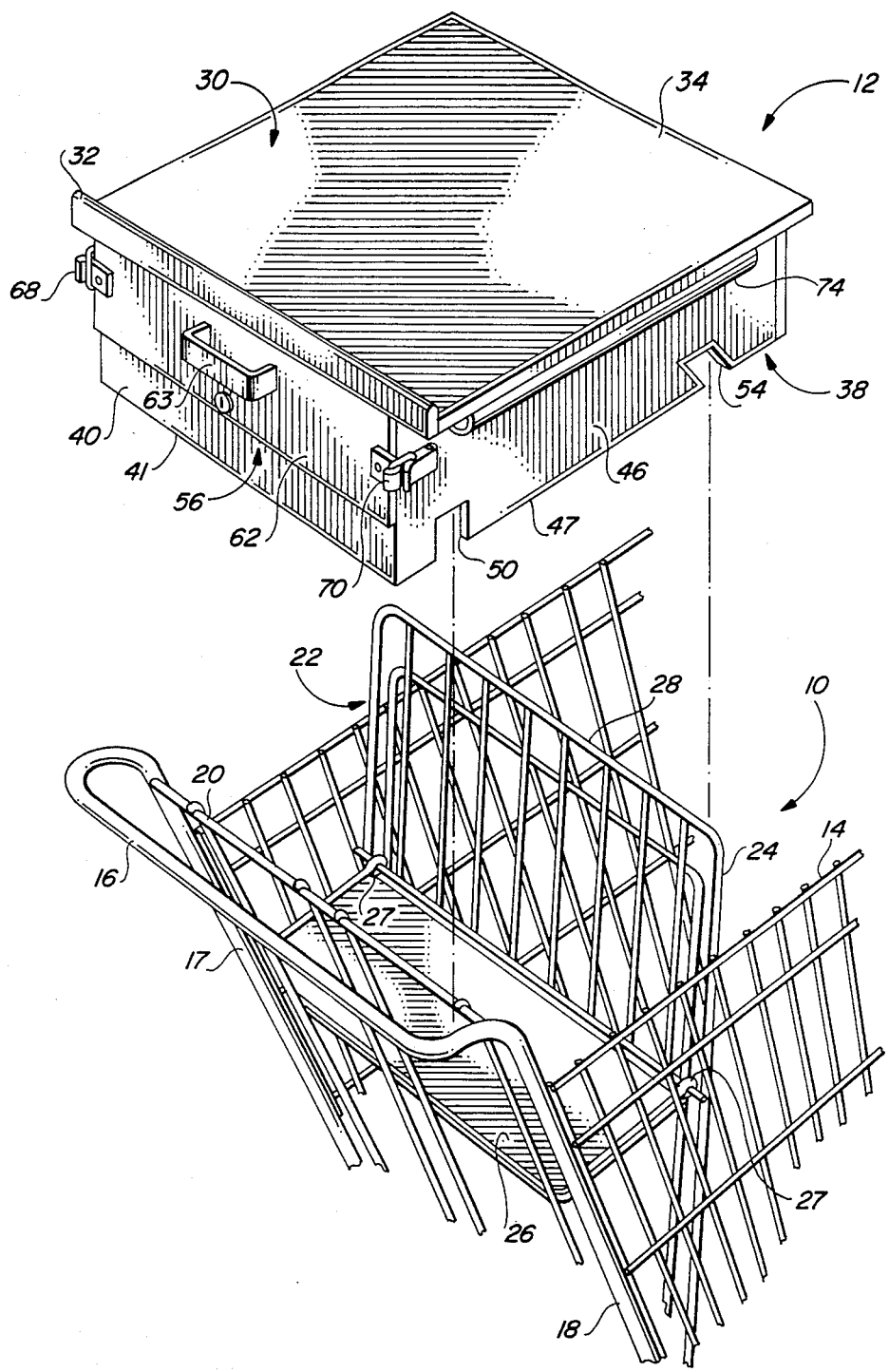
FIG. 1 is a fragmentary perspective view of a typical shopping cart with the portable desk and article carrying case structure of the present invention being shown is exploded relationship therewith.

Referring more particularly to the drawings, FIG. 1 shows a fragmentary portion of a typical shopping cart of the well known type in common use in grocery stores and the like, with the cart being indicated generally by the reference numeral 10. FIG. 1 also shows a first embodiment of the portable desk and article carrying structure of the present invention which is indicated in its entirety by the reference numeral 12.

The shopping cart 10 is shown to include the usual article carrying basket 14 having a push handle 16 mounted between the upper ends of suitable bars 17 and 18 provided at the rear, or push handle end, of the cart. A transversely extending cross bar 20 is connected between the bars 17 and 18 proximate the push handle 16. It will be understood that other cross bars (not shown) extend between the bars 17 and 18 at the lower ends thereof and that the cart is a wheeled structure as is well known.

In addition to the above, the shopping cart 10 includes a childs seat assembly 22 which includes a back rest 24 which is provided with means (not shown) on its lower end by which the entire childs seat assembly 22 can be collapsed toward the push handle end of the cart. As is customary, the seat assembly 22 further includes a seat 26 which is pivotably coupled as at 27 to the back rest 24 to permit the seat 26 to be collapsed when the back rest is pushed toward the push handle end of the shopping cart. When the childs seat assembly 22 is in the extended position shown, the top cross bar 28 of the back rest 24 will be in spaced relationship with the transverse cross bar 20 that is adjacent the push handle 16.

As will hereinafter be described in detail, the transverse cross bar 20 and the top cross bar 28 of the shopping cart 10 provide the means for supportively mounting the portable desk and article carrying structure 12 of the present invention on the shopping cart 10.

Figure 2:
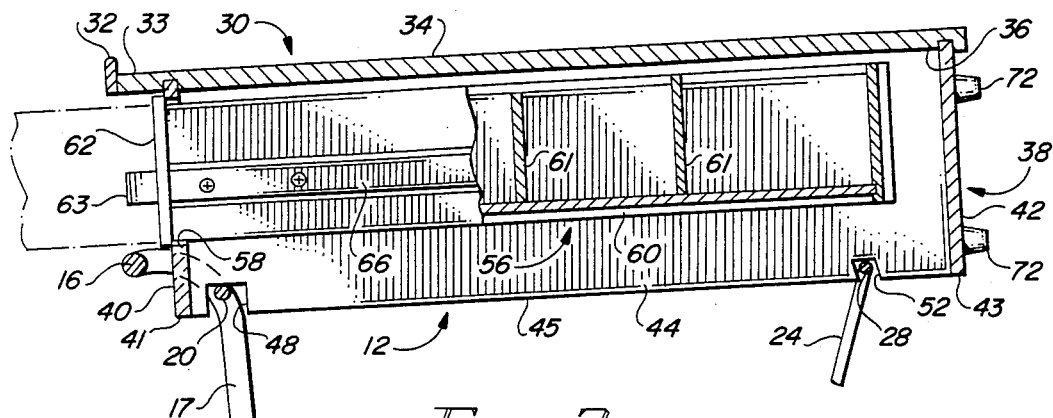
FIG. 2 is a sectional view taken through the portable desk and article carrying structure of the present invention to illustrate the various features thereof and also to illustrate the mounting thereof on the shopping cart.

As seen best in FIGS. 1 and 2, the portable desk and article carrying structure 12 includes a desk top 30 of planar configuration which may be provided with an upstanding ledge 32 which extends longitudinally of its front edge 33. The desk top 30 has a planar top surface 34 for use as a writing surface and for use in accomplishing various other tasks, and a planar bottom surface 36 from which an integral case means 38 fixedly depends.

The case means 38 includes a front wall 40 having a lower edge 41, a rear wall 42 having a lower edge 43 and an opposed pair of sidewalls 44 and 46 having a lower edges 45 and 47 respectively. The front wall 40, rear wall 42 and the sidewalls 44 and 46 form a skirt-like enclosure which is open on the bottom and the open bottom is surrounded and thereby defined by the lower edges 41, 43, 45 and 47 of the walls.

The sidewall 44 is provided with a first notch 48 proximate its front edge and disposed so as to open onto the lower edge 45 thereof. Similarly, the sidewall 46 is provided with a first notch 50 proximate its front edge and disposed so as to open onto the lower edge 47 thereof. Those first notches 48 and 50 provide the case means 38 with a first pair of aligned notches. The sidewall 44 is provided with a second notch 52 proximate its rear edge and disposed so as to open onto the lower edge 45 thereof. Similarly, the opposed sidewall 46 is formed with a second notch 54 proximate its rear edge and disposed so as to open onto the lower edge 47 thereof. Those second notches 52 and 54 provide the case means 38 with a second pair of aligned notches. The first and second pairs of aligned notches provide means for demountably supporting the portable desk and article carrying structure 12 of the present invention on the shopping cart 10 as will hereinafter be described in detail.

Figure 3:
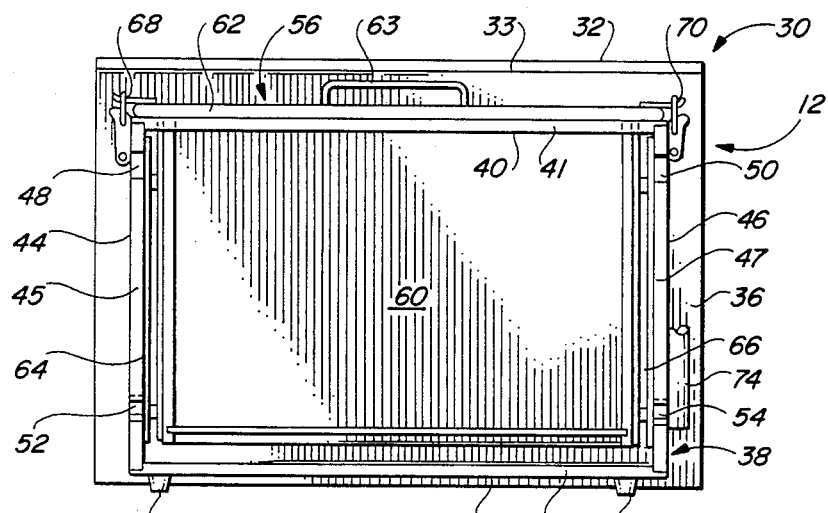
FIG. 3 is a bottom view on a reduced scale of the portable desk and article carrying structure of the present invention.

The case means 38 further include an article carrying means in the form of a drawer structure 56 which is slidably movable from a closed position shown in solid lines in FIG. 2 to an open position as indicated in dashed lines in the same figure. The front wall 40 of the skirt-like enclosure has a suitable opening 58 formed therethrough in which the drawer structure 56 is mounted for the above described sliding movement. The drawer 56 is of the usual construction having an upwardly opening tray-like structure 60 having partitions 61 therein for compartmentalization purposes and having a front face 62 upon which a conventional pull handle means 63 is mounted. The drawer 56 is supported and slidably movable in upwardly spaced relationship with respect to the open bottom of the case means 38 by means of well known drawer mounting hardware such as a pair of track roller assemblies 64 and 66 that are mounted to the inner surfaces of the sidewalls 44 and 46 and to the adjacent sides of the drawer structure 56 as shown in FIG. 3.

The case means 38 is provided with a pair of latch means 68 and 70 which are mounted on the opposite end edges of the front face 62 of the drawer structure 56 and one the adjacent front edges of the opposed sidewalls 44 and 46 of the carrying case. The latch means 68 and 70 are provided to allow the drawer 56 to be latchingly held in the closed position, such as during carrying of the portable deck and article carrying structure 12, and to allow the drawer 56 to be opened during use.

With the drawer structure 56 in the closed positions and the latch means 68 and 70 holding the drawer closed, the portable desk and article carrying structure 12 may be carried in the same manner as a brief case. Suitable feet 72 are mounted so as to extend normally from the rear wall 42 of the carrying case 38 with the feet being usable to allow the structure 12 to be set down in an upright position on any horizontal surface.

As hereinbefore described, the portable desk and article carrying structure 12 of the present invention is primarily intended for use by manufactures representatives, sales people, or anyone else who needs to carry various articles into a store and needs a place to work upon arriving at a work location or locations in the store. Therefore, the above described portable desk and article carrying structure 12 may have various articles such as order forms, product survey sheets, promotional materials, labels and the like carried in the compartmentalized drawer structure 56 thereof and may be equipped with whatever else a particular person may need to accomplish his particular task. For example, an elongated tube 74 may be mounted beneath the projecting edge of the desk top 30, as seen best in FIG. 1, for carrying a feather duster (not shown).

Upon arriving in a store, the person carrying the portable desk and article carrying structure 12 may utilize the hereinbefore described shopping cart 10 for demountably supporting the structure 12 in a proper substantially horizontal attitude and at a proper height for writing and accomplishing whatever other tasks that need to be accomplished. As shown, the first pair of aligned notches 48 and 50 of the case 38 are spaced from the second pair of aligned notches 52 and 54 thereof, a distance which matches the spaced relationship between the transverse cross bar 20 of the shopping cart 10 and the top cross bar 28 of the back rest 24 thereof. Therefore, by placing the portable desk and article carrying structure 12 so that the first aligned pair of notches 48 and 50 are stradlingly placed on the cross bar 20 of the shopping cart 10 and the second pair of aligned notches 52 and 54 are similarly placed on the top cross bar 28 of the back rest 24, the structure 12 is supportingly carried in the desired attitude on the shopping cart 10 at the push handle end thereof.

As shown, the second aligned pair of notches 52 and 54 of the case means 38 slope upwardly and angularly from the lower edges 45 and 47 of their respective sidewalls 44 and 46 toward the front wall 40 of the case means 38. The angular attitude of these second notches 52 and 54 facilitate pivotable movement of the portable desk and articles carrying structure 12 as an entity on the top cross rod 28 of the shopping cart 10 to permit access to the childs seat 26 so that the seat can be used to temporarily store articles if desired.

Figure 4:
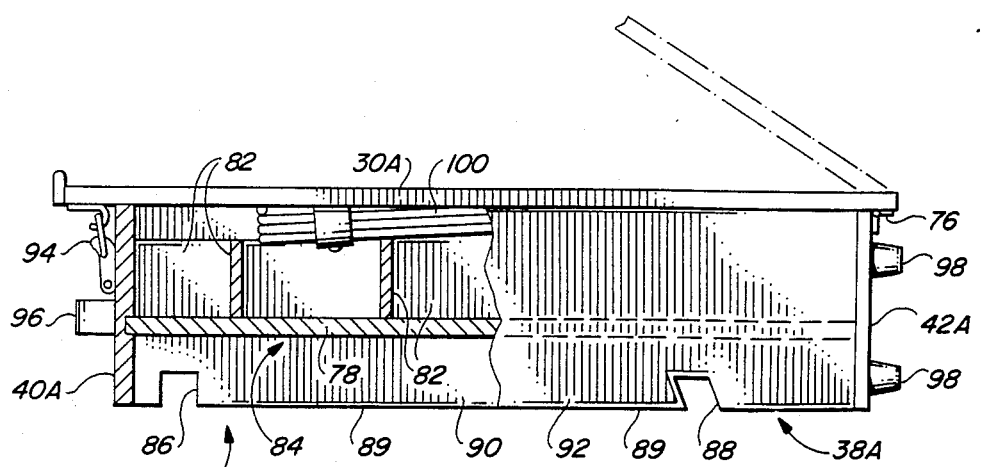
FIG. 4 is a side elevational view of an alternate embodiment of the portable desk and article carrying structure of the instant invention with portions thereof being broken away to show the various features thereof.

Reference is now made to FIG. 4 wherein a second embodiment of the portable desk and article carrying structure is identified in its entirety by the reference numeral 12A. In this embodiment, the planar desk top 30A is hingedly mounted as at 76 to the rear wall 42A of the case means 38A. Instead of the drawer structure 56 of the previously described carrying case 38, the case 38A is formed with an article carrying means in the form of upwardly recessed bottom wall 78, and suitable partitions 82 which form an upwardly opening tray-like structure 84 within the carrying case 38A. In that the compartmentalized structure 84 is fixedly mounted in the case means 38A access thereto is gained by hingedly lifting the desk top 30A to the open position indicated in dashed lines in FIG. 4.

As was the case with the hereinbefore described structure 12, the case means is provided with a first aligned pair of notches 86 (one shown) and a second aligned pair of notches 88 (one shown) in the lower edges 89 of the opposed sidewalls 90 and 92 of the case means 38A. These aligned pairs of notches 86 and 88 allow the structure 12A to be demountably supported on the shopping cart 10 (FIG. 1) in the manner hereinbefore fully described.

The portable desk and article carrying structure 12A is provided with a latch means 94 on the front wall 40A of its case means and the lower surface of the forwardly projecting portion of the desk top 30A for selectively holding the deck top in the closed position. The front wall 40A of the case means 38A has a suitable carrying handle 96 mounted thereon and a plurality of feet 98 extend normally from the rear wall 42A thereof. This allows the portable deck and article carrying structure 12A to be carried and set down in an upstanding position as fully described above.

The second embodiment of the portable deck and article carrying structure 12A may be used to carry various articles as previously described and may be equipped with various accessories as needed or desired. For example, an expandable file 100 may be fixedly carried on the planar bottom surface of the desk top 30A.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. A portable desk and article carrying structure for demountable placement on a shopping cart of the type having a push handle with a spaced apart pair of cross rods proximate the push handle, said structure comprising:
   (a) a planar desk top;
   (b) case means beneath said desk top and having four walls with lower edges that cooperatively surround an open bottom end of said case means;
   (c) said case means having first and second aligned pairs of notches formed in the lower edges of an opposed pair of the four walls of said case means for receiving the cross rods of the shopping cart when said structure is demountably placed thereon; and
   (d) article carrying means in said case means in upwardly spaced relationship with respect to the open bottom end thereof.

2. A portable desk and article carrying structure as claimed in claim 1 wherein the four walls of said case means comprise a front wall, a rear wall and an opposed pair of sidewalls with the first and second aligned pairs of notches being formed in the lower edges of the opposed pair of sidewalls.

3. A portable desk and article carrying structure as claimed in claim 2 wherein the first aligned pair of notches are formed in the lower edges of the opposed pair of sidewalls of said case means proximate the front wall thereof and the second aligned pair of notches are formed in the lower edges of the opposed pair of sidewalls of said case means proximate the rear wall of said case means.

4. A portable desk and article carrying structure as claimed in claim 1 and further comprising:
   (a) said case means being fixedly attached so as to depend from said desk top and having an opening formed in one of the four walls thereof;
   (b) said article carrying means being in the form of a drawer means; and
   (c) means for mounting said drawer means in said case means for sliding movement between a closed position wherein said drawer means is in said case means and an open position wherein said drawer means extends from said case means through the opening formed in the one of the four walls of said case means.

5. A portable desk and article carrying structure as claimed in claim 4 and further comprising:
   (a) said drawer means having a front face which is located at the opening formed in the one of the four walls of said case means when said drawer is in the closed position;
   (b) handle means on the front face of said drawer means; and
   (c) latch means for selectively latching said drawer means in the closed position to allow said structure to be carried by said handle means.

6. A portable desk and article carrying structure as claimed in claim 1 and further comprising:
   (a) hinge means mounted on said case means and said desk top to allow hinged movement of the desk top between opened and closed positions relative to said case means; and
   (b) said article carrying means being in the form of an upwardly open tray-like structure which is fixedly mounted in said case means.

7. A portable desk and article carrying structure as claimed in claim 6 and further comprising:
   (a) handle means on the exterior surface of one of the four walls of said case means; and
   (b) latch means for selectively holding said desk top in the closed position thereof to allow said structure to be carried by said handle means.

8. A portable desk and article carrying structure for demountable placement on a shopping cart of the type having a transverse cross rod proximate the push handle thereof and a top cross rod at the upper end of the back rest of a childs seat of the shopping cart, said structure comprising:
   (a) a planar desk top;
   (b) case means beneath said desk top, said case means having a front wall, a back wall and an opposed pair of sidewalls, said front, back and pair of sidewalls each having a lower edge with those edges surroundingly defining an open bottom of said case means;
   (c) said opposed pair of sidewalls of said case means having a first pair of aligned notches formed in the lower edges thereof proximate the front wall of said case means for engaging the transverse cross rod of the shopping car upon placement of said structure thereon;
   (d) said opposed pair of sidewalls of said case means having a second pair of aligned notches formed in the lower edges thereof proximate the back wall of said case means for engaging the top cross rod of the back rest of the shopping cart upon placement of said structure thereon; and
   (e) article carrying means in said case means in upwardly spaced relationship with respect to the open bottom thereof.

9. A portable desk and article carrying structure as claimed in claim 8 and further comprising:
   (a) said case means being in fixed depending relationship with said desk top;
   (b) said article carrying means being in the form of a drawer;
   (c) said case means having an opening formed in the front wall thereof; and
   (d) means for mounting said drawer means in said case means for sliding movement between a closed position wherein said drawer means is in said case means and an open position wherein said drawer means extends from said case means through the opening formed in the front wall thereof.

10. A portable desk and article carrying structure as claimed in claim 9 and further comprising:
    (a) said drawer means having a front face which is located at the opening formed in the front wall of said case means when said drawer means is in the closed position;
    (b) handle means on the front face of said drawer means; and
    (c) latch means for selectively holding said drawer means in the closed position to allow said structure to be carried by said handle means.

11. A portable desk and article carrying structure as claimed in claim 10 wherein said drawer means is provided with partitions for compartmentalization thereof.

12. A portable desk and article carrying structure as claimed in claim 8 and further comprising:
    (a) hinge means mounted on said case means and said desk top to allow hinged movement of said desk top between opened and closed positions relative to said case means; and
    (b) said article carrying means being in the form of an upwardly opening tray-like structure which is fixedly mounted in said case means.

13. A portable desk and article carrying structure as claimed in claim 12 and further comprising:
    (a) handle means on the exterior surface of said case means; and
    (b) latch means for selectively holding said desk top in the closed position thereof to allow said structure to be carried by said handle means.

14. A portable desk and article carrying structure as claimed in claim 12 wherein said upwardly opening tray-like structure is provided with partitions for compartmentalization thereof.

* * * * *